United States Patent
Sivaraj et al.

(10) Patent No.: US 11,451,485 B2
(45) Date of Patent: Sep. 20, 2022

(54) DYNAMIC PACKET SIZE ADAPTATION TO IMPROVE WIRELESS NETWORK PERFORMANCE FOR 5G OR OTHER NEXT GENERATION WIRELESS NETWORK

(71) Applicant: AT&T Intellectual Property I, L.P., Atlanta, GA (US)

(72) Inventors: Rajarajan Sivaraj, Dublin, CA (US); Subhabrata Sen, Westfield, NJ (US); Zhengye Liu, Pleasanton, CA (US); Jin Wang, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 6 days.

(21) Appl. No.: 16/832,787

(22) Filed: Mar. 27, 2020

(65) Prior Publication Data
US 2021/0306278 A1  Sep. 30, 2021

(51) Int. Cl.
| | |
|---|---|
| H04L 47/36 | (2022.01) |
| H04L 47/283 | (2022.01) |
| H04L 47/193 | (2022.01) |
| H04L 69/16 | (2022.01) |
| H04L 43/0817 | (2022.01) |
| H04L 43/0864 | (2022.01) |
| H04L 1/00 | (2006.01) |

(Continued)

(52) U.S. Cl.
CPC .......... *H04L 47/365* (2013.01); *H04L 1/0002* (2013.01); *H04L 43/0817* (2013.01); *H04L 43/0864* (2013.01); *H04L 47/193* (2013.01); *H04L 47/27* (2013.01); *H04L 47/283* (2013.01); *H04L 69/16* (2013.01); *H04W 28/06* (2013.01)

(58) Field of Classification Search
CPC ................. H04L 1/0006; H04L 1/0007; H04L 43/08–0894; H04L 47/193; H04L 47/196; H04L 47/27; H04L 47/283; H04L 47/36; H04L 47/365; H04L 69/16; H04W 28/06
See application file for complete search history.

(56) References Cited

U.S. PATENT DOCUMENTS 10,880,223 B1 *  12/2020  Peden ................... H04L 47/365
2008/0062877 A1 *   3/2008  Chen ....................... H04L 47/24
                                                                370/235

(Continued)

*Primary Examiner* — Pao Sinkantarakorn
*Assistant Examiner* — Pawaris Sinkantarakorn
(74) *Attorney, Agent, or Firm* — Amin, Turocy & Watson, LLP

(57) ABSTRACT

Various embodiments disclosed herein provide for identifying optimal data packet size to achieve a higher throughput a wireless communication network. According to some embodiments, a system can comprise monitoring a transmit control protocol performance associated with a first transmission of data packets over a first duration of time, wherein a packet size of the data packets is a first data packet size, detecting that the transmit control protocol performance satisfies a function with respect to a threshold and in response to the detecting that transmit control protocol performance satisfies the function with respect to the first threshold, determining a second data packet size to use for a second transmission of the data packets over a second duration of time, transmitting a request to change the packet size of the data packets to the second data packet.

20 Claims, 12 Drawing Sheets

(51) Int. Cl.
*H04W 28/06* (2009.01)
*H04L 47/27* (2022.01)

(56) References Cited

U.S. PATENT DOCUMENTS

| | | | |
|---|---|---|---|
| 2012/0155518 A1* | 6/2012 | Nakamura | H04L 1/0007 375/219 |
| 2013/0258891 A1* | 10/2013 | Egan | H04L 47/365 370/252 |
| 2016/0119238 A1* | 4/2016 | Jia | H04L 47/36 709/224 |
| 2018/0077075 A1* | 3/2018 | Sreenivasan | H04L 45/26 |
| 2019/0268276 A1* | 8/2019 | Lee | H04L 43/10 |

\* cited by examiner

DYNAMIC PACKET SIZE ADAPTATION TO IMPROVE WIRELESS NETWORK PERFORMANCE FOR 5G OR OTHER NEXT GENERATION WIRELESS NETWORK

TECHNICAL FIELD

This disclosure relates generally to Peer to peer uplink or downlink communication over a 4G or 5G wireless communication system. More specifically, facilitating dynamic packet size adaptation to improve wireless network performance, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities.

5G offers a new suite of services called ultra-Reliable Low-Latency Communication (uRLLC) that requires stringent user-plane and control-plane latency constraints. For example, these may include interactive AR/VR for remote factory automation, mission-critical communications and remote surgery, and intelligent transportation services such as crash avoidance for connected cars, which require user-plane latencies of 0.5 millisecond (ms), 1 ms and 11 ms, respectively. Another class of 5G services called enhanced Mobile Broad-Band (eMBB) deals with more bandwidth-intensive applications such as immersive AR/VR with 360° video streaming, requiring user-plane latencies of 20 ms, with 70 ms being the maximum tolerable limit. While uRLLC services are expected to be served exclusively over 5G radio links, the services could be jointly served by both 4G LTE and 5G radio links. However, 4G LTE networks are primed to handle high throughput but not optimized for latency.

The above-described background relating to relating service requiring low latency, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
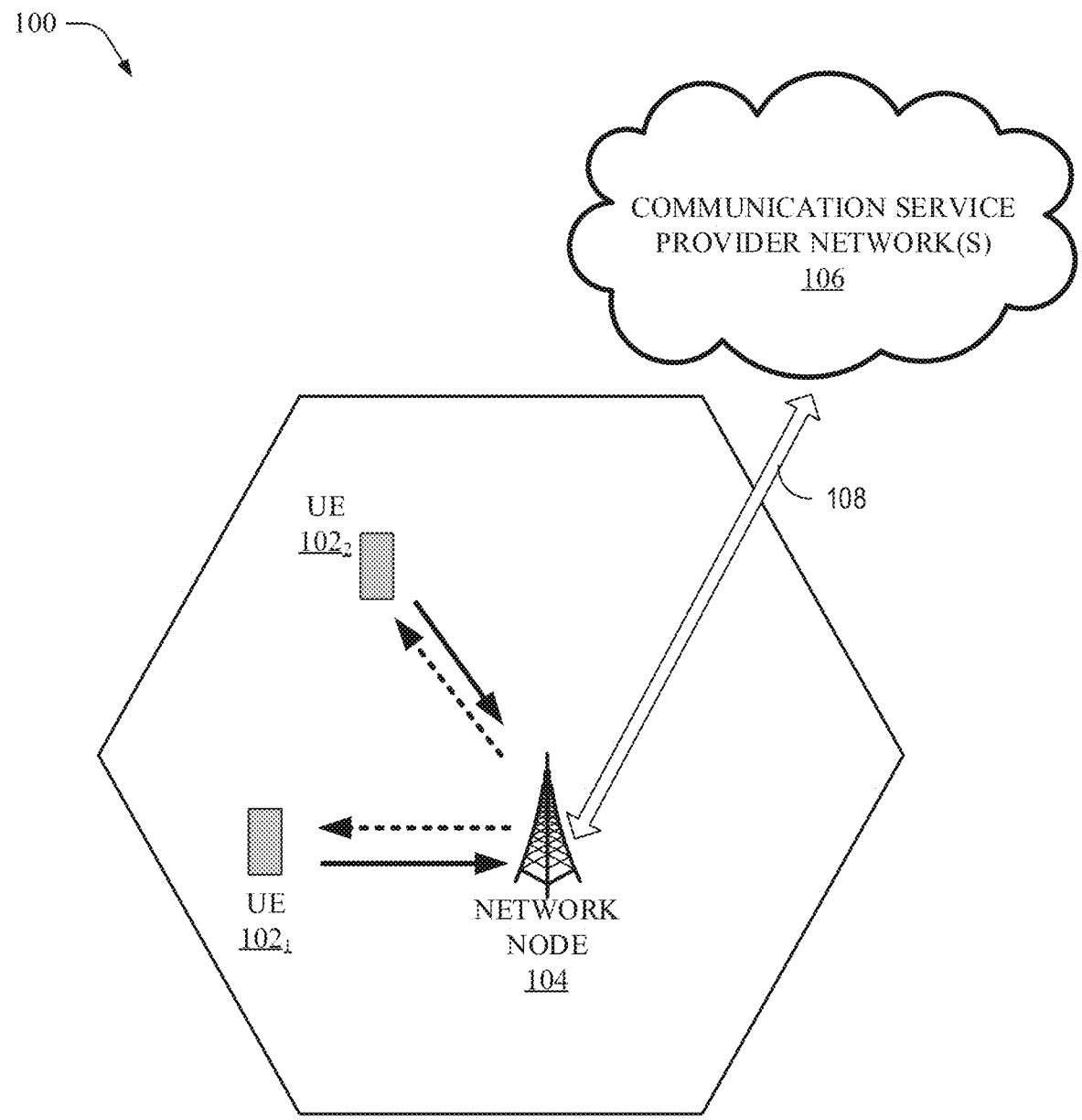
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate dynamic packet size adaptation to improve wireless network performance. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 902.XX technology. Additionally, substantially all aspects disclosed herein can be exploited in legacy telecommunication technologies.

Described herein are systems, methods, articles of manufacture, and other embodiments or implementations that can facilitate dynamic packet size adaptation to improve wireless network performance. Facilitating dynamic packet size adaptation to improve wireless network performance can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

As an overview, described herein is the inter-dependency between cellular Radio Access Network (RAN) user-plane latency and Internet Protocol (IP) throughput for Transmission Control Protocol (TCP) based downloads utilizes IP packets for transmitting data. In some embodiments, a technique utilized for optimizing application throughput by improving TCP performance for cellular networks (both LTE and 5G) that involves monitoring the RAN conditions (e.g., round trip time (RTT) and signal strength) and dynamically adapting the packet size for a TCP connection to optimize its throughput. Under certain conditions, large packets are not always optimal for network performance, since they do not always yield high IP throughputs, due to their potentially-adverse impact on RAN latency. In many cases, smaller IP packet may yield lower RAN latency and subsequently, higher IP throughputs, under specific network conditions. Addressing the trade-offs between the choice of larger IP packets and smaller IP packets in network performance is relevant for both 4G and 5G systems.

For LTE, with fixed TTIs, the size of an IP packet for a UE determines its segmentation in the radio link control (RLC) layer. Segmentation of an IP packet results in multiple RLC PDUs, and the size of each RLC PDU is based on the instantaneous channel conditions of the UE (which impacts the SINR and modulation rate of the UE) and the cell load (which impacts the residual PRBs allocated to the UE). Each RLC PDU results in a MAC PDU that is transmitted to the UE, per TTI. For given UE channel and cell load conditions, a larger IP packet size results in a higher segmentation, and hence, higher TTIs to transmit the entire packet. This increases the downlink user-plane RAN latency of the packet. Upon receiving the entire packet, the UE sends a TCP ACK to the server in the uplink. Due to the higher RAN latency, the TCP RTT also becomes higher. This results in a very conservative increase in the TCP congestion window (cwnd). At times, there would be frequent dips in TCP cwnd due to potential TCP retransmission time-outs, caused by a higher RTT. Both these factors adversely impact the IP throughput. This limits LTE from optimally serving eMBB traffic (jointly with 5G) like AR/VR, HD live video, etc., which require both high throughput and low latency.

For 5G, using a fixed packet size is also not the best choice. 5G NR supports the notion of flexible TTIs with shorter TTI durations. Shorter TTIs result in faster transmission of IP packets, resulting in smaller RTT values. This further causes the TCP cwnd to grow faster, quickly overcoming the TCP slow-start phase. This is again key to improving the performance of both eMBB and uRLLC applications. Too large a packet size for the instantaneous RAN conditions might significantly limit the network and the application from fully utilizing the benefits offered by flexible TTI design in NR. The gains offered by shorter TTIs may be marred by higher segmentation of the IP packet, in the case of a larger packet size. In some embodiments, a RAN-assisted online IP packet size guidance system that can be used to select the optimal TCP Maximum Segment Size (which determines the resulting IP packet size) for each TCP flow can be utilized improve performance. Described herein is a system and method to dynamically adapt the maximum transmission unit (MSS)/maximum TCP segment size (MTU) to dynamically control the RTT and therefore, the application throughput. In some embodiments, the method comprises (i) monitoring the RTT and the TCP behavior/TCP throughput over time, (ii) signal strength (iii) cell load, and through artificial intelligence adapting the MTU/MSS. For example, for a flow, the system can assign an MSS at the beginning of the flow and use it through the flow. For another flow, the system can dynamically adapt the MSS within a flow.

In some embodiments, reducing the IP packet size may cause loss in IP throughput. To compensate for the loss, the RTT may be reduced. Reduction in RTT causes quicker growth in TCP congestion window and gains in IP throughput. When there is RLC PDU segmentation, an IP packet undergoes higher RAN latency and hence, higher TCP RTT. Reducing IP packet size reduces RLC PDU segmentation, reducing TCP RTT thereby causing a growth in TCP cwnd. An ideal packet size is one where the loss in packet size is less than the gain in the growth of TCP cwnd, translating to increased IP throughput. Thus, the optimal IP packet size is a function of the instantaneous RLC PDU size.

The MTU/MSS size can the resulting IP packet size and the TCP segment size (excluding the IP header). These parameters are configured at the TCP server that generates the IP packets using iPerf3 data streaming. The MTU/MSS size can be configured ranging from 250 bytes to 1500 bytes, to generate IP packets of different sizes. According to an embodiment, the system and method comprises 1. Monitoring the RTT and signal strength by the application, 2. Dynamically adjusting the TCP MSS/MTU, based on the observed RTT and signal strength, so as to optimize its future performance and hence, the overall flow throughput. Using shorter packets (coming from smaller MSS/MTUs) yields higher throughputs, especially in scenarios where the RAN latency is high due to poor RF or loaded cells or both. This trade-off is due to the impact of RAN latency. Higher MTU yielding a larger packet size causes a higher RAN latency, which results in a higher TCP RTT. This further results in a very conservative increase or frequent dips in TCP congestion window, which adversely impacts IP throughput. Smaller MTUs yield lower RAN latency, in challenging RF/load scenarios, resulting in lower TCP RTT, causing a more aggressive increase in TCP congestion window, which further increases IP throughput.

According to some embodiments, in order to determine the optimal packet size, RAN assisted TCP MTU optimization is performed at the core network. For example, identify key RAN parameters (e.g., KPIs) affecting TCP performance, which may include, but not limited to, RSRP, user load, PDCP PDU size. Note that the PDCP PDU size results from the configured MTU/MSS size. The key RAN parameters can be determined during the flow or can be retrieved from a database.

For each RAN condition corresponding to a given combination of experimental parameters categorized as {high, medium, low} (e.g., RSRP, user load, PDCP PDU size), create a profile of the TCP RTT, congestion window and the overall flow performance in terms of its IP throughput. In some embodiments, the profile can be created based on historical data. In some embodiments, the profile can be created online based on real-time RAN feed, generating the above RAN key performance indicators (KPIs).

Determine the TCP MSS/MTU parameter setting that is optimal for each categorized RAN setting, yielding the maximum IP throughput for that setting. In one embodiment, this determination of TCP parameter setting could be done based on historical data. In another embodiment, this determination of optimal TCP parameter setting could be done online based on real-time RAN feed, generating the above RAN KPIs. In another embodiment, determination can be done based on historical data and/or done online based on real-time RAN feed, generating the above RAN KPIs.

Create a table mapping each RAN setting to the corresponding optimal TCP MSS/MTU parameter setting and at run time, based on predicted RAN conditions, use the table to determine the corresponding optimal TCP MSS/MTU parameter setting.

In some embodiments, a system integrating MTU adaptation guidance analytics (based on RAN/TCP latencies) as a micro-service to optimize MTU or IP packet sizes for TCP-based data streaming at the core network, or in application design is disclosed herein. The Data Collection, Analytics, and Events (DCAE) subsystem receive the RAN KPIs from the real-time feed generated from eNBs deployed network operator. The micro-services module running in DCAE can publish real-time RAN/TCP latency and optimal MTU size prediction results using our model. The server can provide MTU adaptation results to subscribers. The subscribers can include the Multi-Server Proxy (MSP) in the core network or the application which streams payload to the UE. MTU guidance to MSP is regarded as a closed-loop guidance system, where the prediction results are being fed back to the network, to improve operations. If MTU guidance is provided to a third-party application, it is regarded as a case of open-loop guidance, since the application can use this guidance in optimizing content delivery of a third-party app.

According an embodiment, a system can comprise a processor and a memory that stores executable instructions that, when executed by the processor, facilitate performance of operations comprising monitoring a transmit control protocol performance associated with a first transmission of data packets over a first period, wherein a packet size of the data packets is a first data packet size. The system can further facilitate identifying that the transmit control protocol performance is below a threshold. The system can further facilitate in response to the identifying that transmit control protocol performance is below the threshold, determining a second data packet size to use for a second transmission of the data packets over a second period. The system can further facilitate transmitting a message comprising the second data packet size and a request to change the packet size of the data packets to the second data packet size.

According to another embodiment, described herein is a method that can comprise monitoring, by a device comprising a processor, a transmit control protocol performance associated with a first transmission of data packets over a first time period, wherein the data packets are of a first data packet size. The method can further comprise detecting, by the device, that a transmit throughput value associated with a transmission of the first transmission of a data packet of the data packets is below a threshold. The method can further comprise in response to the detecting that transmit throughput value is below the first threshold, determining, by the device, a second data packet size to use for a second transmission of the data packets over a second time period. The method can further comprise transmitting, by the device, message comprising the second data packet size and a change request to change the data packets from the first data packet size to the second data packet size.

According an embodiment, a system can comprise a processor and a memory that stores executable instructions that, when executed by the processor, facilitate performance of operations comprising monitoring a transmit control protocol performance associated with a first transmission of data packets over a first duration of time, wherein a packet size of the data packets is a first data packet size. The system can further facilitate detecting that the transmit control protocol performance satisfies a function with respect to a threshold. The system can further facilitate in response to the detecting that transmit control protocol performance satisfies the function with respect to the first threshold, determining a second data packet size to use for a second transmission of the data packets over a second duration of time. The system can further facilitate transmitting a request to change the packet size of the data packets to the second data packet size.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 110 in accordance with various aspects and embodiments of the subject disclosure. In one or more embodiments, system 110 can comprise one or more user equipment UEs 112. The non-limiting term user equipment (UE) can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 112 can also comprise IOT devices that communicate wirelessly.

In various embodiments, system 110 is or comprises a wireless communication network serviced by one or more wireless communication network providers. In example embodiments, a UE 112 can be communicatively coupled to the wireless communication network via a network node 114. The network node (e.g., network node device) can communicate with user equipment (UE), thus providing connectivity between the UE and the wider cellular network. The UE 112 can send transmission type recommendation data to the network node 114. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 112 can send and/or receive communication data via a wireless link to the network node 114. The dashed arrow lines from the network node 114 to the UE 112 represent downlink (DL) communications and the solid arrow lines from the UE 112 to the network nodes 114 represents an uplink (UL) communication.

System 110 can further include one or more communication service provider networks 116 that facilitate providing wireless communication services to various UEs, including UE 112, via the network node 114 and/or various additional network devices (not shown) included in the one or more communication service provider networks 116. The one or more communication service provider networks 116 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 110 can be or include a large scale wireless communication network that spans various geographic areas. According to this implementation, the one or more communication service provider networks 116 can be or include the wireless communication network and/or various additional devices and components of the wireless communication network (e.g., additional network devices and cell, additional UEs, network server devices, etc.). The network node 114 can be connected to the one or more communication service provider networks 116 via one or more backhaul links 118. For example, the one or more backhaul links 118 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 118 can also include wireless link components, such as but not limited to, line-of-sight (LOS) or non-LOS links which can include terrestrial air-interfaces or deep space links (e.g., satellite communication links for navigation).

Wireless communication system 110 can employ various cellular systems, technologies, and modulation modes to facilitate wireless radio communications between devices (e.g., the UE 112 and the network node 114). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 110 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 110 are particularly described wherein the devices (e.g., the UEs 112 and the network device 114) of system 110 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 110 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >7 GHz) to aid in increasing capacity. Currently, much of the millimeter wave (mmWave) spectrum, the band of spectrum between 30 GHz and 300 GHz is underutilized. The millimeter waves have shorter wavelengths that range from 11 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

In some embodiments, when a packet is received at the PDCP layer, the packet is segmented into one or more RLC packet data units (e.g., generation of RLC PDU). For each RLC PDU, a MAC PDU is generated. Typically, the number of RLC PDU that are generated is based on size of the IP packet (also referred to as data packet, or packet). As discussed below, the latency is determined when the last MAC PDU is delivered to the UE. In LTE and 5G, an IP packet is successfully delivered when the UE provides an acknowledgement that the UE received the MAC PDU. This acknowledgement can be for each MAC PDU transmitted to the UE. For example, if three MAC PDU are transmitted to UE, then three acknowledgements are transmitted to the eNB, wherein the third acknowledgement indicates that the IP packet was delivered.

If the packet size is large, thereby creating larger number of RLC PDU and MAC PDU combination, and network conditions are bad (e.g., low network data traffic or low RF signal strength) the RAN latency can be impacted. If the acknowledgement is not received, for example, due to network congestion, a time out occurs and the eNB retransmit the MAC PDU. This would cause an increase in RAN latency (see FIG. 2 for illustration) and increased RTT. If the latency or throughput falls below an acceptable level, the system can request the transmitting entity to reduce the size of the IP packet. The new packet size can be determined based on historical data collected by the eNB or the core network or retrieved from online services. In some embodiments, the IP packet size is provided to the transmitting entity after determining using KPI's. In some embodiments, the IP packet size is determined using the required RAN latency requirement. In some embodiments, the transmitting entity can accept the provided IP packet size or reject it. In some embodiments, the transmitting entity is provided data to calculate the reduced IP packet size by using historical data or retrieve it from database.

Figure 2:
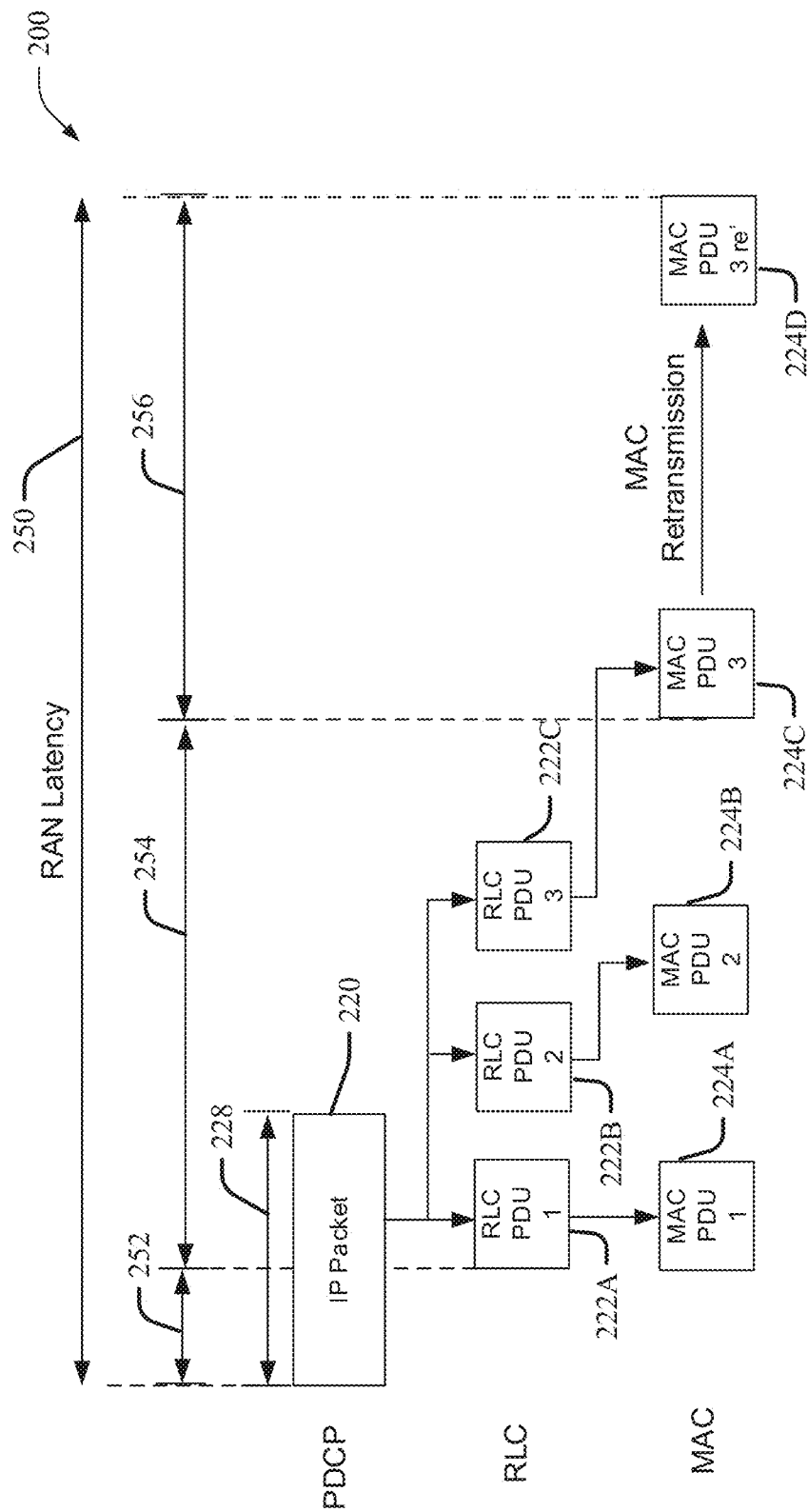
FIG. 2 illustrates a radio access network (RAN) latency showcase in accordance with one or more embodiments described herein.

FIG. 2 illustrates a radio access network (RAN) latency showcase 200 in accordance with one or more embodiments described herein. In some embodiments, an IP packet arrives at a PDCP layer to be delivered to the UE. Depending on the size of the IP packet, one or more RLC PDUs are generated, wherein a MAC PDU is associated with each RLC PDU. As illustrated, for IP packet 220 having a packet size of 228 generates three RLC PDU's 222A, 222B and 222C. For each RLC PDUs 222A, 222B and 222C a MAC PDU 224A, 224B and 224C, respectively, is generated. The latency for a IP packet is determined based on the last MAC PDU (e.g., MAC PDU 3 224C) is successfully transmitted to the UE. As illustrated, when a IP packet size 228 is large the latency can increase if the MAC PDU 3 224C requires a retransmission of the MAC PDU (e.g., MAC PDU re'3 224D) due to network conditions. Depending on network conditions, there is over RAN latency 250, which the time it takes to successfully transmit a IP packet to UE once received at the PDCP layer. As illustrated, latency can be caused at each layer. For example, there is initial scheduling latency 252 which is time difference from the time a packet is received at a PDCP layer to the time a first RLC PDU 1 22A is generated. There is RLC delay 254, which is the time difference from the generation of the first RLC PDU of the IP packet to the time its last IP packet (e.g., MAC PDU 3) is transmitted. This delay depends on, but limited to, MAC scheduler that adjusts and schedules RLC PDUs based on cell load, RF conditions, etc. There is a MAC delay 256, which is time taken to successfully transmit a PDU to UE.

Figure 3:
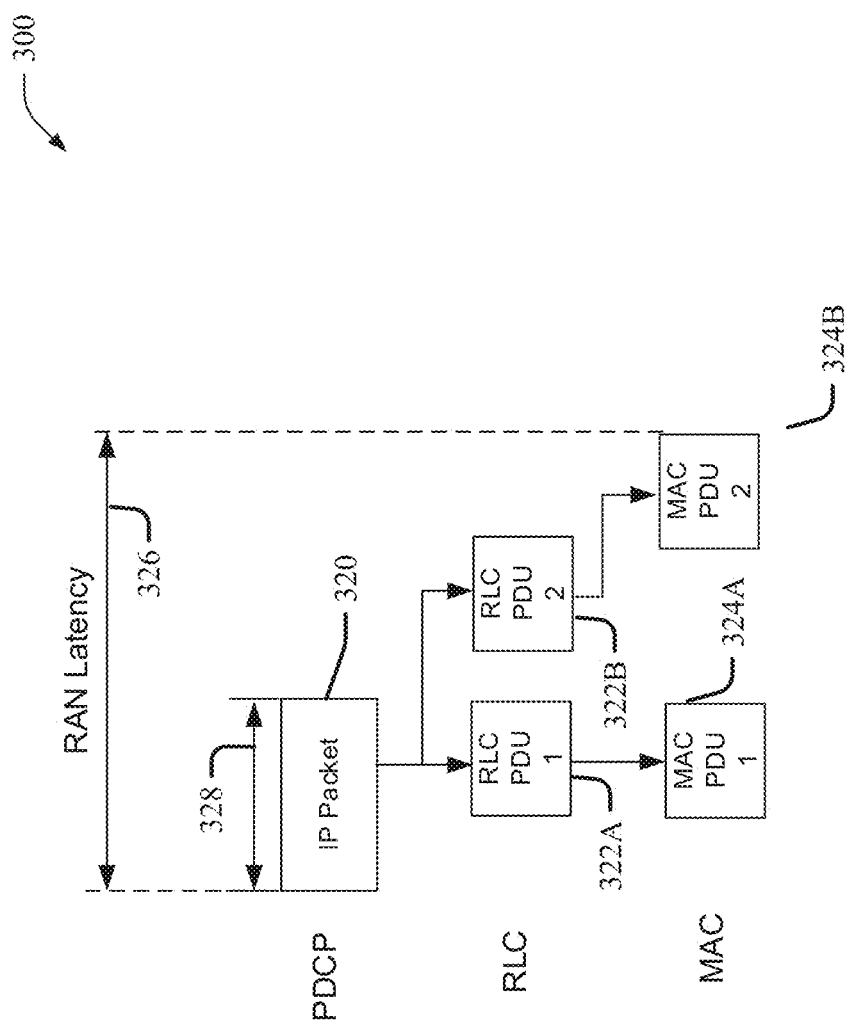
FIG. 3 illustrates a radio access network (RAN) latency showcase for a RAN that utilizes a smaller IP packet in accordance with one or more embodiments described herein.

FIG. 3 illustrates a radio access network (RAN) latency showcase 300 for a RAN that utilizes a smaller IP packet in accordance with one or more embodiments described herein. In some embodiments, when the size of the IP packet is reduced, the RAN latency is also reduced. Illustrated herein is latency showcase 300 for a network that transmits an IP packet 320 having a packet size of 328. Due the size of the IP packet, only two RLC PDUs 322A and 322B are generated having a MAC PDU 1 324A and a MAC PDU 2 324B, respectively. As discussed above, the RAN latency is determined from the time the system receives a IP packet at the PDCP layer to the last MAC PDU is successfully delivered to the UE. Thus, as illustrated, RAN Latency 326 can be lower compared to the RAN Latency 250 of FIG. 2. This is due to the system having to deliver less MAC PDUs before the next packet is received.

Figure 4:
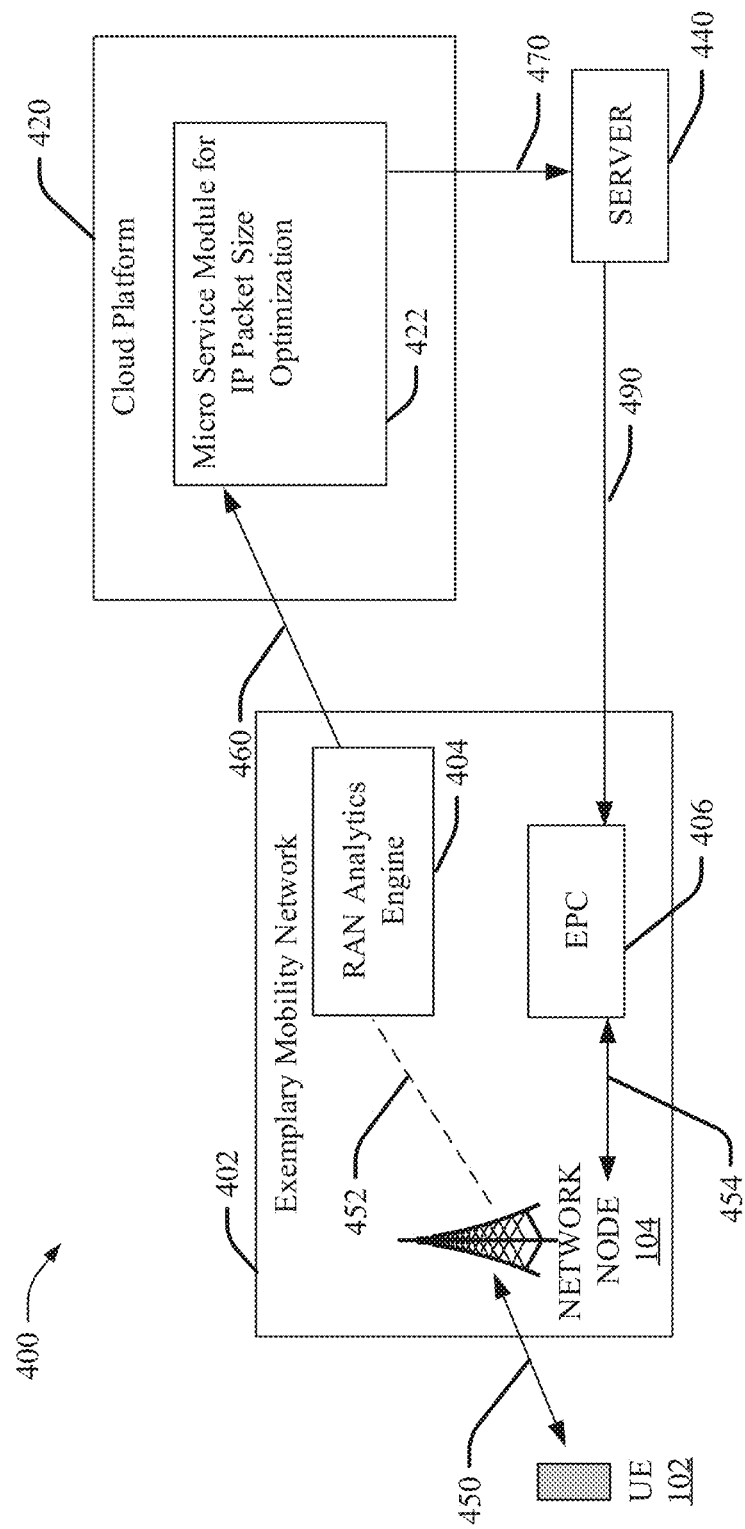
FIG. 4 illustrates an exemplary network in accordance with one or more embodiments described herein

FIG. 4 illustrates an exemplary network 400 in accordance with one or more embodiments described herein. In some embodiments, the network comprises a network node 114 that communicatively connected to a UE 112, via first communication link 450, an evolved packet core (EPC) 406 (via second communication link 454) and RAN analytics engine 404 (e.g., also referred to as software-defined RAN (SD-RAN)). In some embodiments, the RAN analytics engine 404 is placed at the edge of mobility network 402. The RAN analytics engine 404 received real-time RAN performance counter data as raw data streams via a third communication link 452. The RAN analytics engine 404 computes and predicts key performance indicators (KPI), for example but not limited to, RLC segmentation, RAN latency/throughput, cell-site PRB utilization, UE-specific RSRP, etc. These computed and predicted KPIs are streamed to micro service module 422, via a fourth communication link 460, for IP packet size optimization in a cloud platform 422. The optimal IP packet sizes are determined based on the computed RAN KPI streams received from the SD-RAN analytics engine 404 at the mobile edge. In some embodiments, the $3^{rd}$ party application server 440 (e.g., an external server, controller or any electronic component comprising transmitting, receiving, storing and processing functionalities) subscribes, via a fifth communication link 470, to this micro-service deployed in the SDN-based cloud platform (with public IP address), which offers the computed IP packet size as a guidance. Upon receiving guidance, the $3^{rd}$ party application server 440 periodically adapts the IP packet sizes to the recommended values for transmission to the network node via the EPC 406 over a sixth communication link 490. In some embodiments, the updated IP packet sizes are provided directly to the network node 114.

Figure 5:
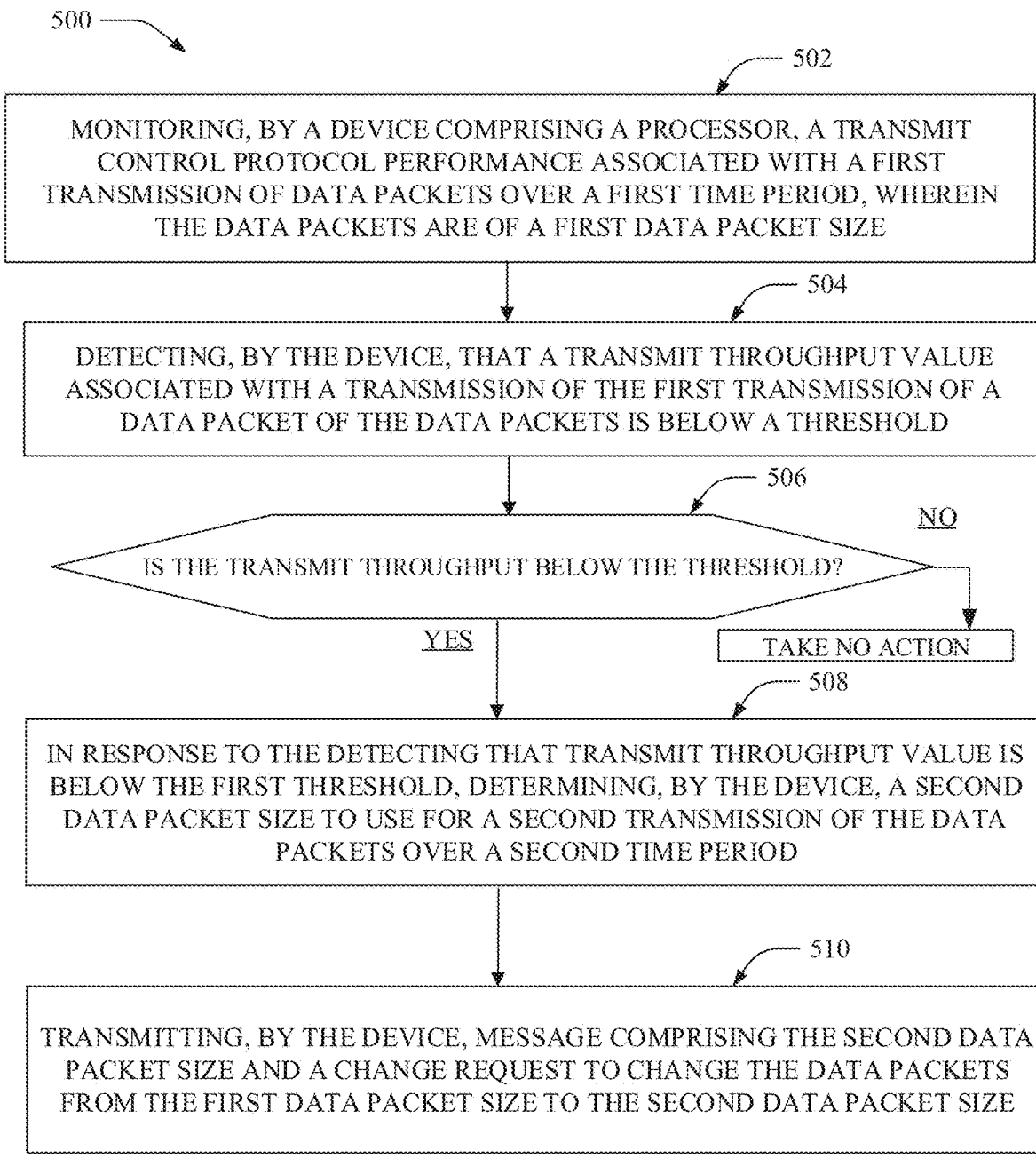
FIG. 5 depicts a diagram of an example, non-limiting computer implemented method that facilitates dynamic packet size adaptation to improve wireless network performance in accordance with one or more embodiments described herein.

FIG. 5 depicts a diagram of an example, non-limiting computer implemented method that facilitates dynamic packet size adaptation to improve wireless network performance in accordance with one or more embodiments described herein. In some examples, flow diagram 500 can be implemented by operating environment 1200 described below. It can be appreciated that the operations of flow diagram 500 can be implemented in a different order than is depicted.

In non-limiting example embodiments, a computing device (or system) (e.g., computer 1202) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 monitoring, by a device comprising a processor, a transmit control protocol performance associated with a first transmission of data packets over a first time period, wherein the data packets are of a first data packet size. Operation 504 depicts detecting, by the device, that a transmit throughput value (e.g., the throughput value may be associated with data packet RTT or latency value) associated with a transmission of the first transmission of a data packet of the data packets is below a threshold (e.g., the threshold may be RAN latency acceptable value or IP packet RTT value). Operation 506 depicts determining, by the device, if the transmit throughput is below the threshold. If yes, then perform operation 508. Otherwise, take no action and continue monitoring, Operation 508 depicts in response to the detecting that transmit throughput value is below the first threshold, determining, by the device, a second data packet size to use for a second transmission of the data packets over a second time period. Operation 510 depicts transmitting, by the device, message comprising the second data packet size and a change request to change the data packets from the first data packet size to the second data packet size.

Figure 6:
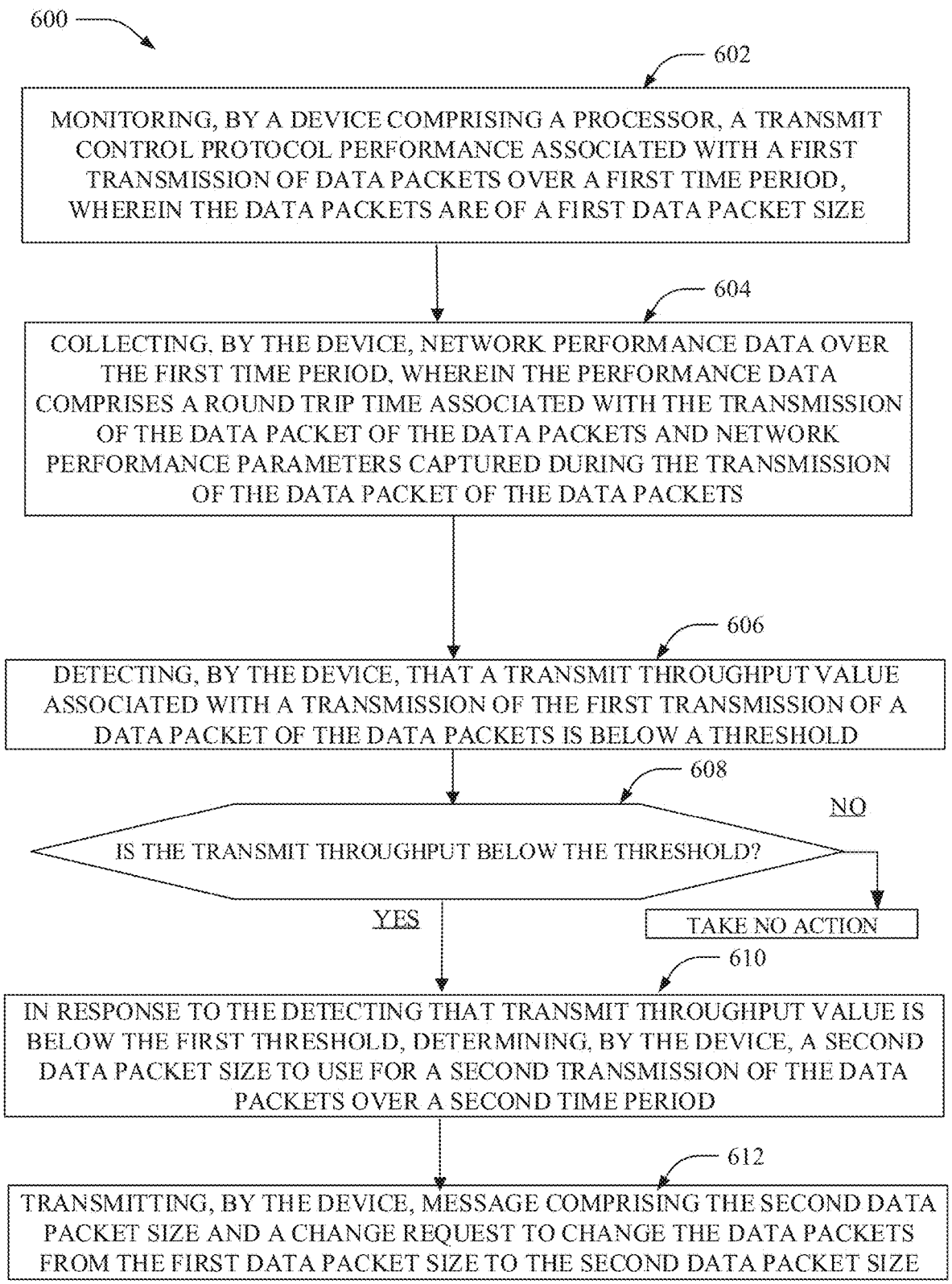
FIG. 6 illustrates a block diagram of an example, non-limiting system that facilitates dynamic packet size adaptation to improve wireless network performance in accordance with one or more embodiments described herein.

FIG. 6 depicts a diagram of an example, non-limiting computer implemented method that facilitates dynamic packet size adaptation to improve wireless network performance in accordance with one or more embodiments described herein. In some examples, flow diagram 600 can be implemented by operating environment 1200 described below. It can be appreciated that the operations of flow diagram 600 can be implemented in a different order than is depicted.

In non-limiting example embodiments, a computing device (or system) (e.g., computer 1202) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 monitoring, by a device comprising a processor, a transmit control protocol performance associated with a first transmission of data packets over a first time period, wherein the data packets are of a first data packet size. Operation 604 depicts collecting, by the device, network performance data over the first time period, wherein the performance data comprises a round trip time associated with the transmission of the data packet of the data packets and network performance parameters captured during the transmission of the data packet of the data packets. Operation 606 depicts detecting, by the device, that a transmit throughput value associated with a transmission of the first transmission of a data packet of the data packets is below a threshold. Operation 608 depicts determining, by the device, if the transmit throughput is below the threshold. If yes, then perform operation 610. Otherwise, take no action and continue monitoring, Operation 610 depicts in response to the detecting that transmit throughput value is below the first threshold, determining, by the device, a second data packet size to use for a second transmission of the data packets over a second time period. Operation 612 depicts transmitting, by the device, message comprising the second data packet size and a change request to change the data packets from the first data packet size to the second data packet size.

Figure 7:
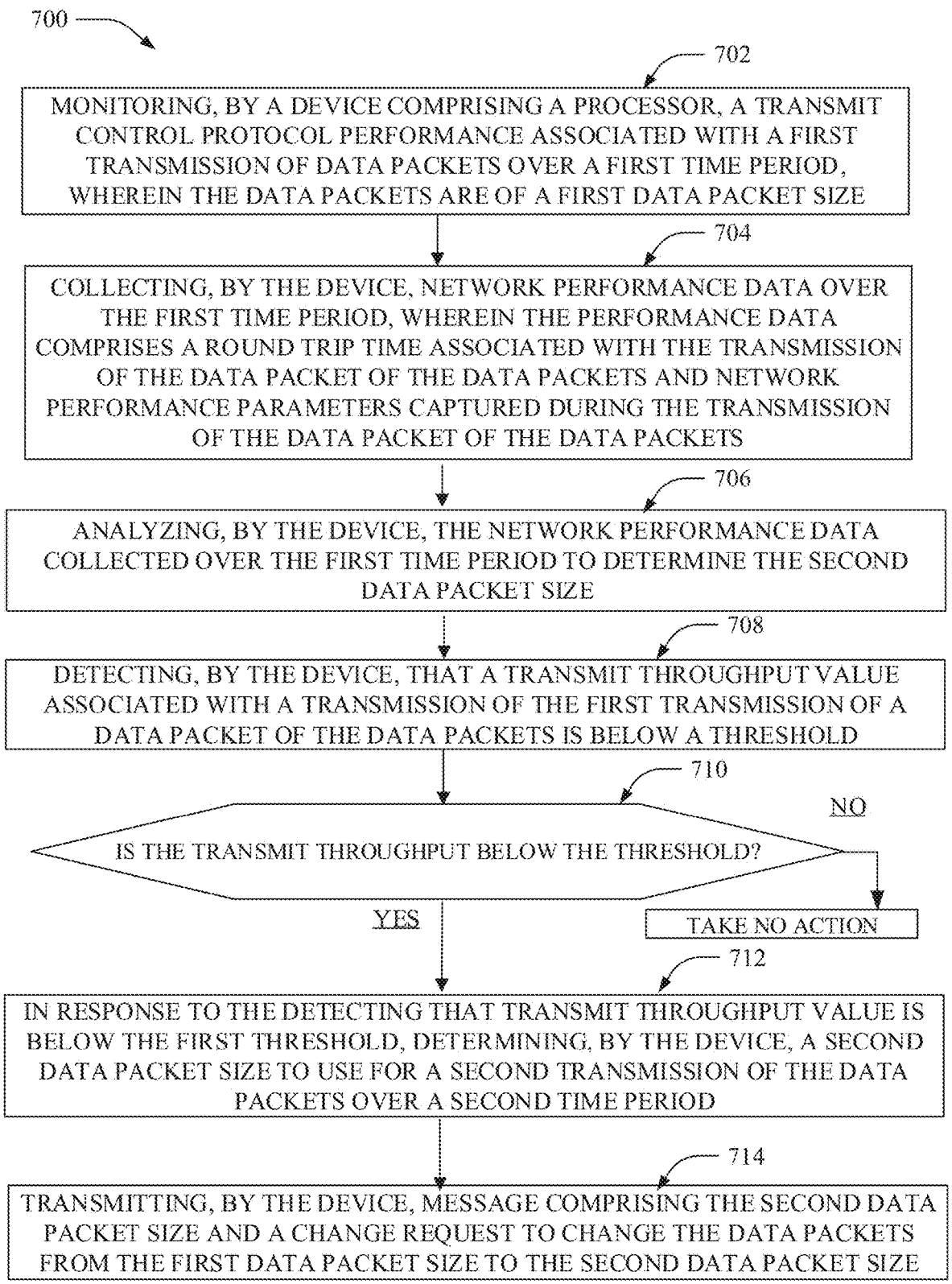
FIG. 7 depicts a diagram of an example, non-limiting computer implemented method that facilitates dynamic packet size adaptation to improve wireless network performance in accordance with one or more embodiments described herein.

FIG. 7 depicts a diagram of an example, non-limiting computer implemented method that facilitates dynamic packet size adaptation to improve wireless network performance in accordance with one or more embodiments described herein. In some examples, flow diagram 700 can be implemented by operating environment 1200 described below. It can be appreciated that the operations of flow diagram 700 can be implemented in a different order than is depicted.

In non-limiting example embodiments, a computing device (or system) (e.g., computer 1202) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 monitoring, by a device comprising a processor, a transmit control protocol performance associated with a first transmission of data packets over a first time period, wherein the data packets are of a first data packet size. Operation 704 depicts collecting, by the device, network performance data over the first time period, wherein the performance data comprises a round trip time associated with the transmission of the data packet of the data packets and network performance parameters captured during the transmission of the data packet of the data packets. Operation 706 depicts analyzing, by the device, the network performance data collected over the first time period to determine the second data packet size. Operation 708 depicts detecting, by the device, that a transmit throughput value associated with a transmission of the first transmission of a data packet of the data packets is below a threshold. Operation 710 depicts determining, by the device, if the transmit throughput is below the threshold. If yes, then perform operation 712. Otherwise, take no action and continue monitoring, Operation 712 depicts in response to the detecting that transmit throughput value is below the first threshold, determining, by the device, a second data packet size to use for a second transmission of the data packets over a second time period. Operation 714 depicts transmitting, by the device, message comprising the second data packet size and a change request to change the data packets from the first data packet size to the second data packet size.

Figure 8:
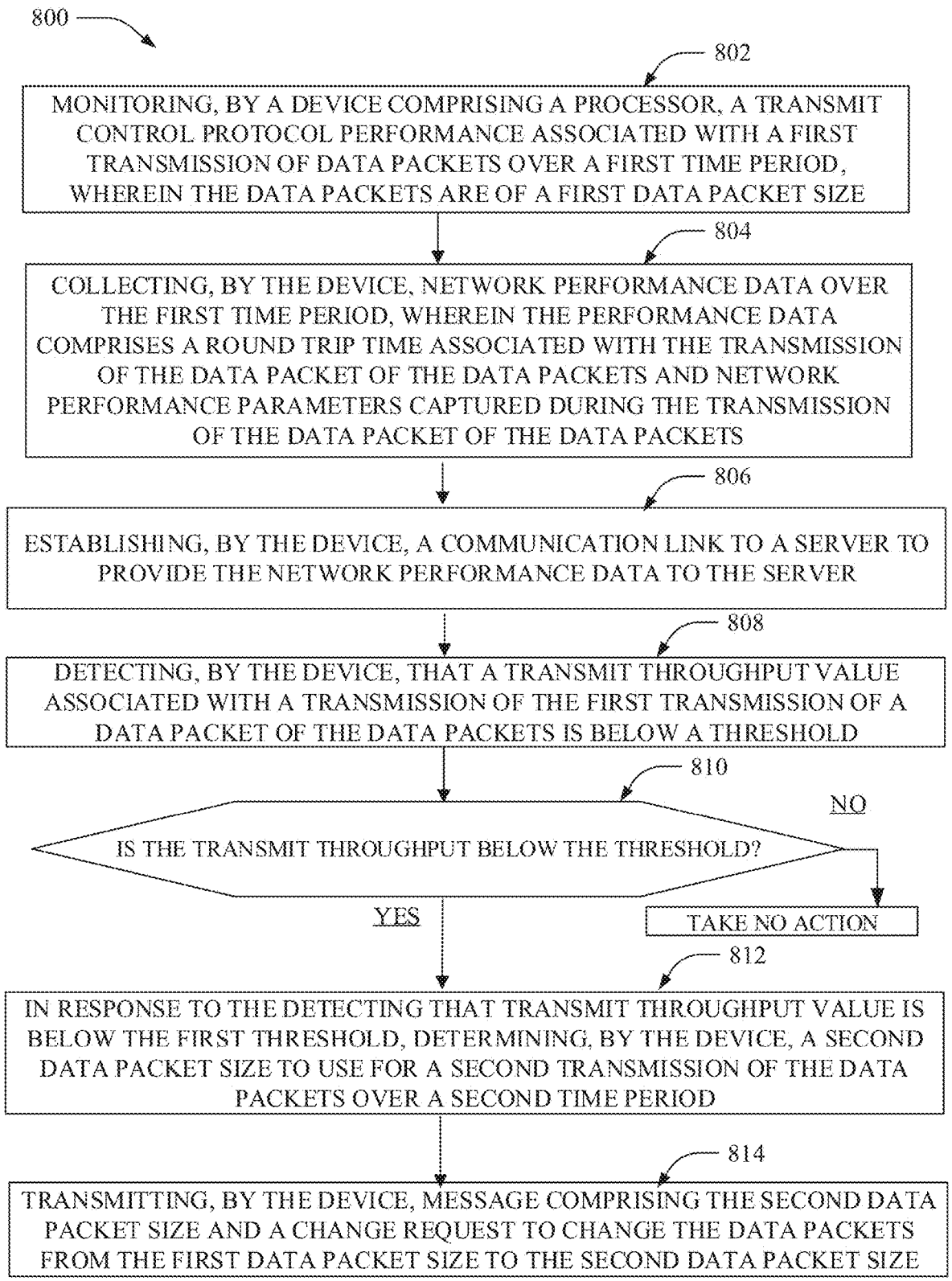
FIG. 8 depicts a diagram of an example, non-limiting computer implemented method that facilitates dynamic packet size adaptation to improve wireless network performance in accordance with one or more embodiments described herein.

FIG. 8 depicts a diagram of an example, non-limiting computer implemented method that facilitates dynamic packet size adaptation to improve wireless network performance in accordance with one or more embodiments described herein. In some examples, flow diagram 800 can be implemented by operating environment 1200 described below. It can be appreciated that the operations of flow diagram 800 can be implemented in a different order than is depicted.

In non-limiting example embodiments, a computing device (or system) (e.g., computer 1202) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 monitoring, by a device comprising a processor, a transmit control protocol performance associated with a first transmission of data packets over a first time period, wherein the data packets are of a first data packet size. Operation 804 depicts collecting, by the device, network performance data over the first time period, wherein the performance data comprises a round trip time associated with the transmission of the data packet of the data packets and network performance parameters captured during the transmission of the data packet of the data packets. Operation 806 depicts establishing, by the device, a communication link to a server to provide the network performance data to the server. Operation 808 depicts detecting, by the device, that a transmit throughput value associated with a transmission of the first transmission of a data packet of the data packets is below a threshold. Operation 810 depicts determining, by the device, if the transmit throughput is below the threshold. If yes, then perform operation 812. Otherwise, take no action and continue monitoring, Operation 812 depicts in response to the detecting that transmit throughput value is below the first threshold, determining, by the device, a second data packet size to use for a second transmission of the data packets over a second time period. Operation 814 depicts transmitting, by the device, message comprising the second data packet size and a change request to change the data packets from the first data packet size to the second data packet size.

Figure 9:
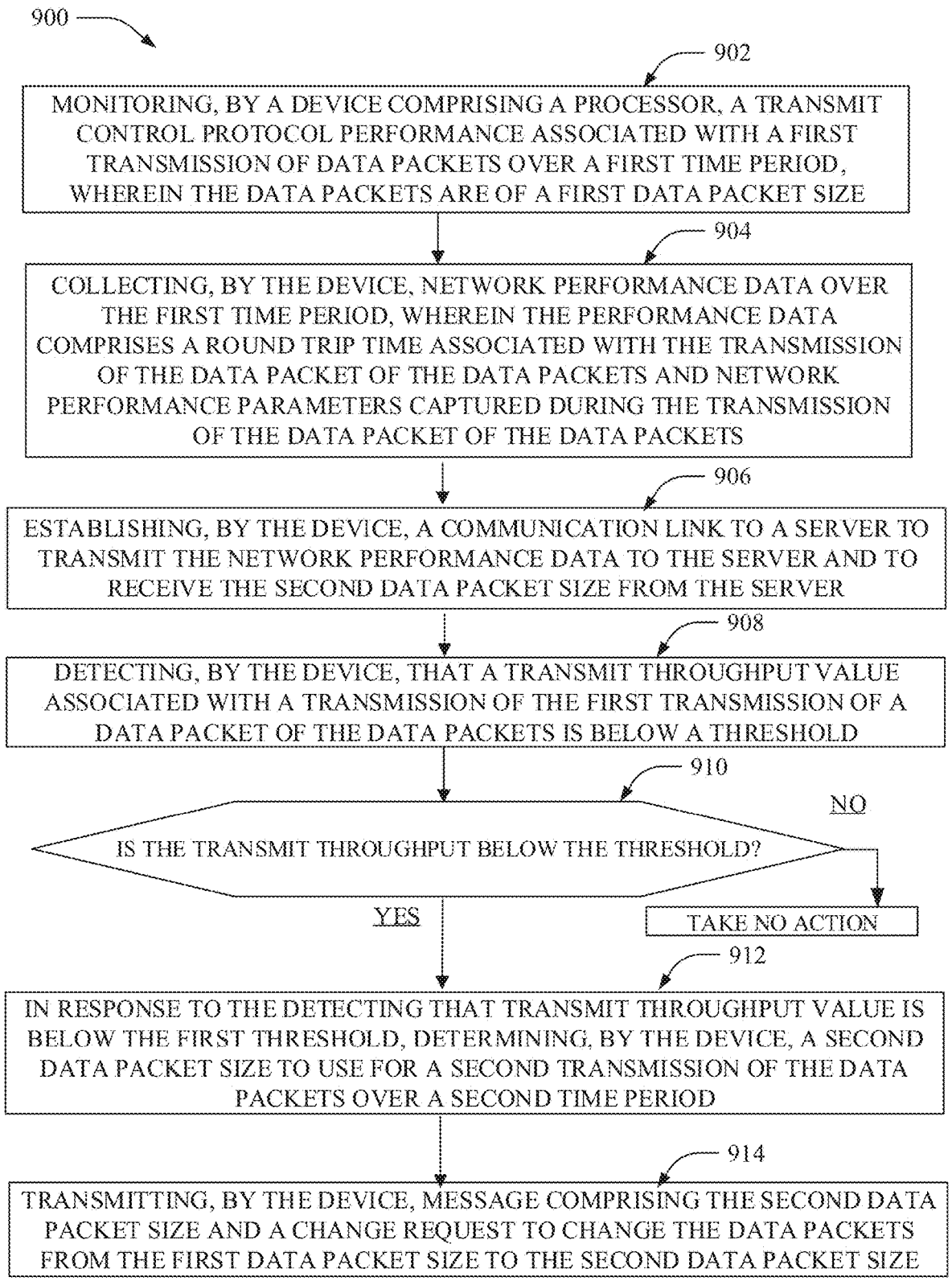
FIG. 9 depicts a diagram of an example, non-limiting computer implemented method that facilitates dynamic packet size adaptation to improve wireless network performance in accordance with one or more embodiments described herein.

FIG. 9 depicts a diagram of an example, non-limiting computer implemented method that facilitates dynamic packet size adaptation to improve wireless network performance in accordance with one or more embodiments described herein. In some examples, flow diagram 900 can be implemented by operating environment 1200 described below. It can be appreciated that the operations of flow diagram 900 can be implemented in a different order than is depicted.

In non-limiting example embodiments, a computing device (or system) (e.g., computer 1202) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 monitoring, by a device comprising a processor, a transmit control protocol performance associated with a first transmission of data packets over a first time period, wherein the data packets are of a first data packet size. Operation 904 depicts collecting, by the device, network performance data over the first time period, wherein the performance data comprises a round trip time associated with the transmission of the data packet of the data packets and network performance parameters captured during the transmission of the data packet of the data packets. Operation 906 depicts establishing, by the device, a communication link to a server to transmit the network performance data to the server and to receive the second data packet size from the server. Operation 908 depicts detecting, by the device, that a transmit throughput value associated with a transmission of the first transmission of a data packet of the data packets is below a threshold. Operation 910 depicts determining, by the device, if the transmit throughput is below the threshold. If yes, then perform operation 912. Otherwise, take no action and continue monitoring, Operation 912 depicts in response to the detecting that transmit throughput value is below the first threshold, determining, by the device, a second data packet size to use for a second transmission of the data packets over a second time period. Operation 914 depicts transmitting, by the device, message comprising the second data packet size and a change request to change the data packets from the first data packet size to the second data packet size.

Figure 10:
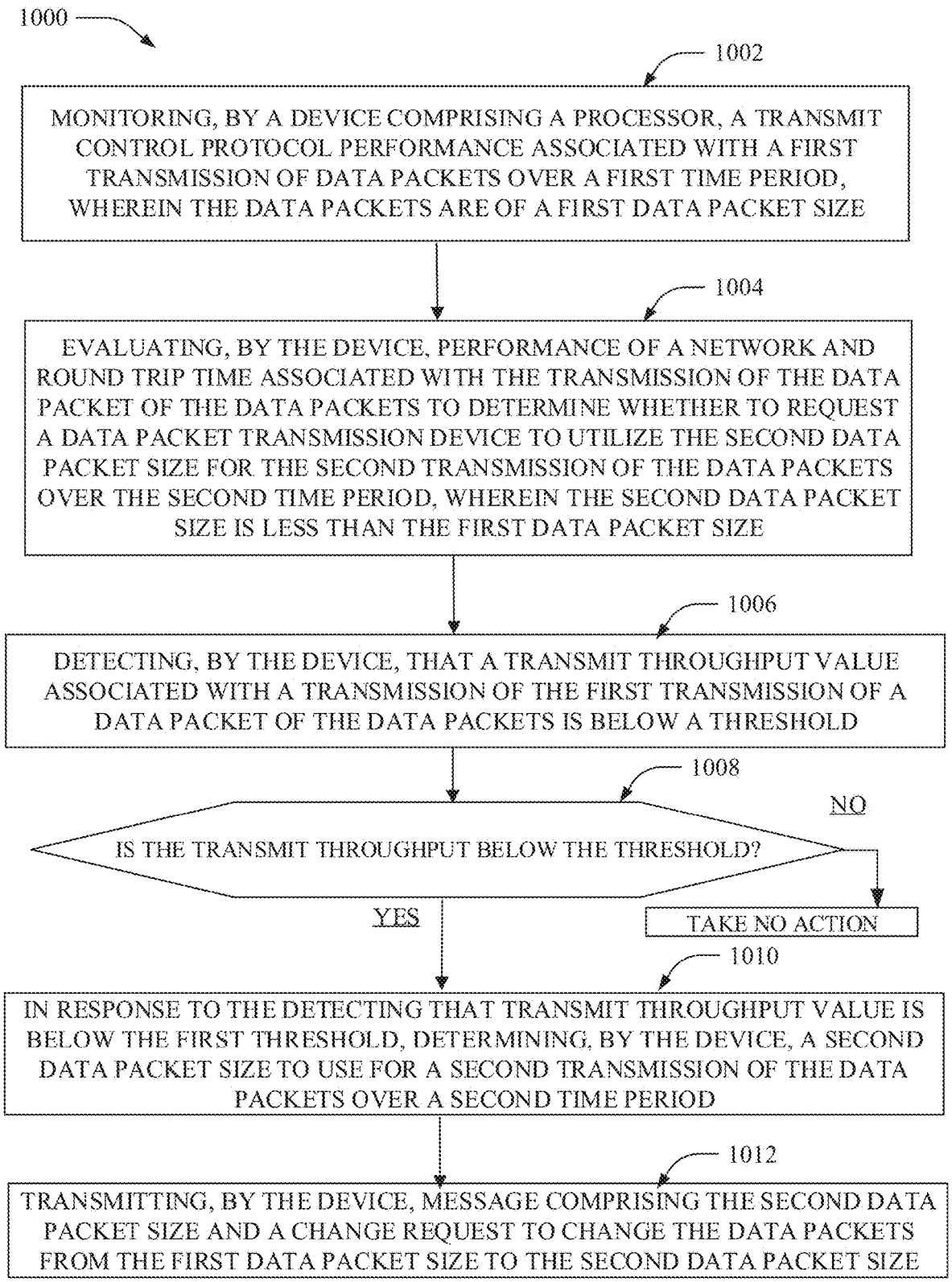
FIG. 10 depicts a diagram of an example, non-limiting computer implemented method that facilitates dynamic packet size adaptation to improve wireless network performance in accordance with one or more embodiments described herein.

FIG. 10 depicts a diagram of an example, non-limiting computer implemented method that facilitates dynamic packet size adaptation to improve wireless network performance in accordance with one or more embodiments described herein. In some examples, flow diagram 1000 can be implemented by operating environment 1200 described below. It can be appreciated that the operations of flow diagram 1000 can be implemented in a different order than is depicted.

In non-limiting example embodiments, a computing device (or system) (e.g., computer 1202) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 monitoring, by a device comprising a processor, a transmit control protocol performance associated with a first transmission of data packets over a first time period, wherein the data packets are of a first data packet size. Operation 1004 depicts evaluating, by the device, performance of a network and round trip time associated with the transmission of the data packet of the data packets to determine whether to request a data packet transmission device to utilize the second data packet size for the second transmission of the data packets over the second time period, wherein the second data packet size is different than the first data packet size. Operation 1006 depicts detecting, by the device, that a transmit throughput value associated with a transmission of the first transmission of a data packet of the data packets is below a threshold. Operation 1008 depicts determining, by the device, if the transmit throughput is below the threshold. If yes, then perform operation 1010. Otherwise, take no action and continue monitoring, Operation 1010 depicts in response to the detecting that transmit throughput value is below the first threshold, determining, by the device, a second data packet size to use for a second transmission of the data packets over a second time period. Operation 1012 depicts transmitting, by the device, message comprising the second data packet size and a change request to change the data packets from the first data packet size to the second data packet size.

Figure 11:
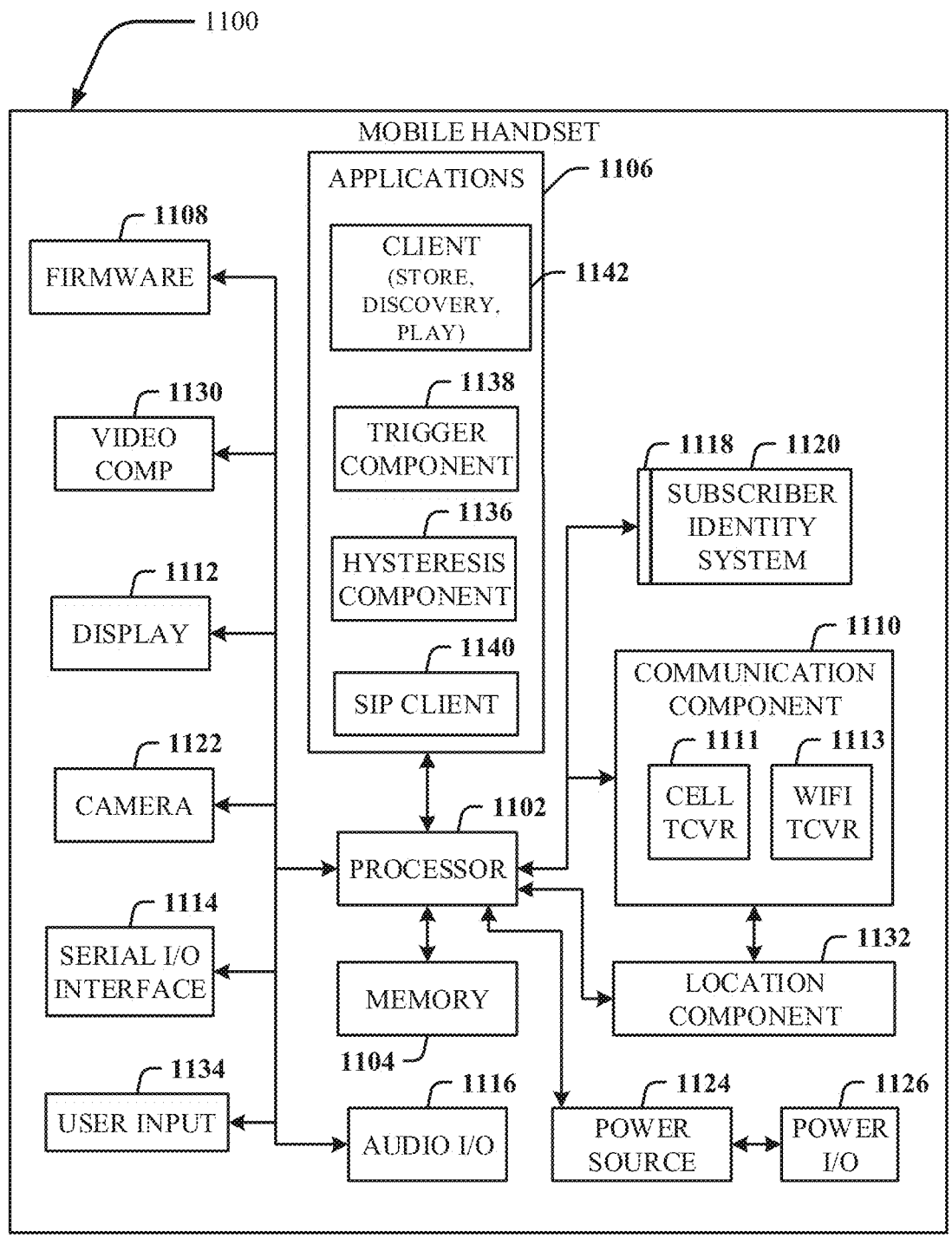
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108 and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE-802.11, for the dual-mode GSM handset 1100. The handset 1100 can accommodate at least satellite radio services through a handset that can combine wireless voice and digital radio chipsets into a single handheld device.

Figure 12:
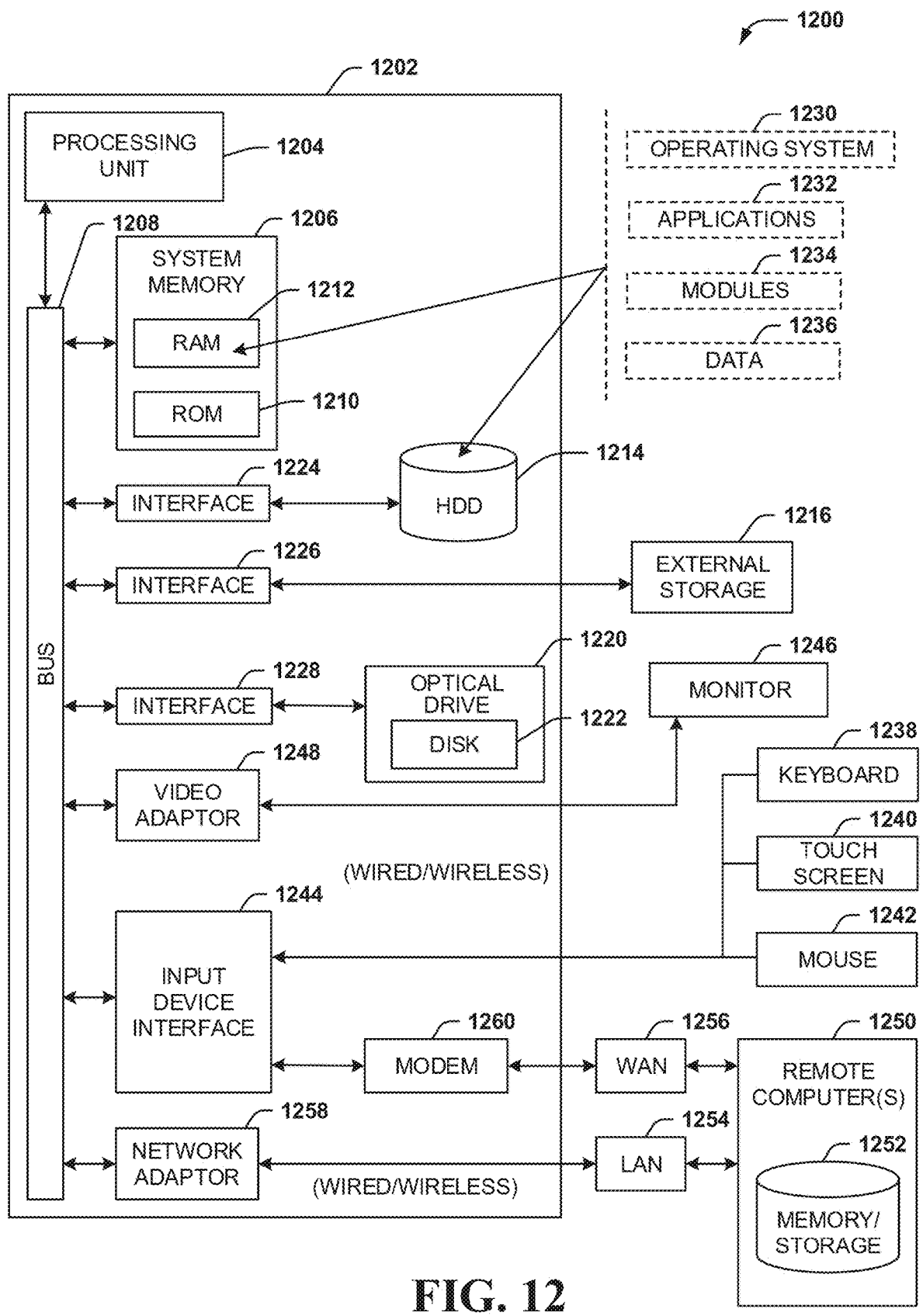
FIG. 12 illustrates an example block diagram of an example computer operable to engage in a system architecture that facilitates secure wireless communication according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server and/or communication device.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
monitoring a transmit control protocol performance associated with a first transmission of data packets over a first period via a network, wherein a packet size of the data packets comprises a first data packet size, and wherein the network comprises at least a fifth generation communication network supporting new radio communication protocols;
evaluating network performance data and a round trip time associated with a transmission of the first transmission of a data packet of the data packets to identify whether the transmit control protocol performance is below a threshold, wherein evaluating the network performance data comprises evaluating different parameters comprising a packet data convergence protocol data unit size;
identifying that the transmit control protocol performance is below the threshold;
in response to identifying that transmit control protocol performance is below the threshold, determining a second data packet size to use for a second transmission of the data packets over a second period, wherein the second data packet size is determined based on historical data for past transmission of other data packets; and
transmitting a message comprising the second data packet size and a request to change the packet size of the data packets to the second data packet size.

2. The system of claim 1, wherein the operations further comprise:
collecting the network performance data over the first period, wherein the network performance data comprises a round trip time associated with a transmission of the first transmission of a data packet of the data packets and network performance parameters captured during the transmission of the data packet of the data packets.

3. The system of claim 2, wherein the operations further comprise:
establishing a communication link to a server to provide the network performance data to the server.

4. The system of claim 2, wherein the operations further comprise:
establishing a communication link to a server to provide the network performance data to the server and to retrieve the second data packet size from the server.

5. The system of claim 1, wherein the second data packet size is different than the first data packet size.

6. The system of claim 1, wherein the second data packet size is determined to be larger than a previously used data packet size.

7. The system of claim 1, wherein the different parameters evaluated further comprise signal strength.

8. The system of claim 1, wherein the different parameters evaluated further comprise network load.

9. A method, comprising:
monitoring, by a device comprising a processor, a transmit control protocol performance associated with a first transmission of data packets over a first time period via a communications network, wherein the data packets comprise data packets of a first data packet size, and wherein the network comprises network equipment that communicates according to at least a fifth generation communication network protocol;
evaluating, by the device, network performance data and a round trip time associated with a transmission of the first transmission of a data packet of the data packets to identify whether the transmit control protocol performance is below a threshold, wherein evaluating the network performance data comprises evaluating various parameters comprising a packet data convergence protocol data unit size;
detecting, by the device, that a transmit throughput value associated with the transmission of the first transmission of the data packet of the data packets is below the threshold;
in response to detecting that transmit throughput value is below the first threshold, determining, by the device, a second data packet size to use for a second transmission of the data packets over a second time period wherein the second data packet size is determined based on historical data for past transmission of other data packets; and
transmitting, by the device, message comprising the second data packet size and a change request to change the data packets from the first data packet size to the second data packet size.

10. The method of claim 9, further comprising:
facilitating, by the device, establishing a communication link to a server to provide the network performance data to the server.

11. The method of claim 9, further comprising:
facilitating, by the device, establishing a communication link to a server to transmit the network performance data to the server and to receive the second data packet size from the server.

12. The method of claim 9, further comprising:
evaluating, by the device, performance of a network and round trip time associated with the transmission of the data packet of the data packets to determine whether to request a data packet transmission device to utilize the second data packet size for the second transmission of the data packets over the second time period, wherein the second data packet size is different than the first data packet size.

13. The method of claim 12, wherein the various parameters evaluated further comprise a signal strength, a network load value and packet data unit size.

14. The method of claim 9, wherein the second data packet size is determined to be larger than a previously used data packet size.

15. A non-transitory machine-readable medium, comprising executable instructions that, when executed by a processor, facilitate performance of operations, comprising:

monitoring a transmit control protocol performance associated with a first transmission of data packets over a first duration of time via a network comprising network equipment that has implemented fifth generation communication technology, wherein a packet size of the data packets is a first data packet size;

collecting performance data over the first duration of time, wherein the performance data comprises a round trip time associated with a data packet of the data packets transmitted according to the first transmission and performance data captured during the first transmission; and evaluating the performance data and the round trip time to determine whether the transmit control protocol performance satisfies a function with respect to the threshold, wherein evaluating the performance data comprises evaluating a group of parameters comprising a packet data convergence protocol data unit size;

detecting that the transmit control protocol performance satisfies the function with respect to the threshold;

in response to detecting that transmit control protocol performance satisfies the function with respect to the first threshold, determining a second data packet size to use for a second transmission of the data packets over a second duration of time wherein the second data packet size is determined based on historical data for past transmissions of other data packets; and transmitting a request to change the packet size of the data packets to the second data packet size.

16. The non-transitory machine-readable medium of claim 15, the operations further comprise:

determining the second data packet size based on evaluating the performance data, wherein the second data packet size is determined to be different than the first data packet size.

17. The non-transitory machine-readable medium of claim 15, the operations further comprise:

establishing a communication link to a server to provide the performance data to the server.

18. The non-transitory machine-readable medium of claim 15, the operations further comprise:

establishing a communication link to a server to receive the second data packet size from the server.

19. The non-transitory machine-readable medium of claim 15, wherein the second data packet size is determined to be larger than a previously used data packet size.

20. The non-transitory machine-readable medium of claim 15, wherein the group of parameters evaluated further comprises a strength parameter corresponding to signal strength, a load parameter corresponding to network load, and a size parameter corresponding to packet data unit size.

* * * * *